United States Patent
Khosrowpour et al.

(10) Patent No.: US 9,838,275 B2
(45) Date of Patent: Dec. 5, 2017

(54) METHOD FOR RESOURCE AND PERFORMANCE MATCHING IN VIRTUAL POOL OF MIXED GRAPHICS WORKLOADS

(71) Applicant: Dell Products L.P., Round Rock, TX (US)

(72) Inventors: Farzad Khosrowpour, Pflugervill, TX (US); Senthil Kumaran Baladhandayutham, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 14/798,022

(22) Filed: Jul. 13, 2015

(65) Prior Publication Data

US 2017/0019296 A1    Jan. 19, 2017

(51) Int. Cl.
*H04L 12/24* (2006.01)
*H04L 12/26* (2006.01)

(52) U.S. Cl.
CPC ...... *H04L 41/5096* (2013.01); *H04L 43/0817* (2013.01); *H04L 41/147* (2013.01); *H04L 41/5009* (2013.01)

(58) Field of Classification Search
CPC ............. H04L 41/0803; H04L 41/5096; H04L 43/0817
See application file for complete search history.

(56) References Cited

U.S. PATENT DOCUMENTS 7,747,730 B1 *   6/2010   Harlow ................ H04L 41/048
                                                     709/202
2009/0222560 A1 * 9/2009   Gopisetty ................ G06F 8/60
                                                     709/226

OTHER PUBLICATIONS

"Activity Based Costing for Component-Based Software Development"—Kemerer et al, Univ. of Pittsburgh, May 2002 http://www.pitt.edu/~ckemerer/CK%20research%20papers/ActivityBasedCosting_FichmanKemerer2002.pdf.*

* cited by examiner

*Primary Examiner* — Randy Scott
(74) *Attorney, Agent, or Firm* — Baker Botts L.L.P.

(57) ABSTRACT

In one embodiment, a method includes, by a cloud services system, determining a baseline actual hardware performance utilization of a plurality of hardware computing devices for a plurality of applications in accordance with an initial mapping that maps a plurality of hardware resource classes to the plurality of applications, where each of the hardware computing devices is associated with one of the plurality of hardware resource classes, determining a lower-cost configuration in which each application is assigned to the hardware class having a lowest equivalent cost for that application, and, when the sum of the lowest equivalent costs for each application assigned to a particular hardware class by the lower-cost configuration is less than a threshold value, moving one or more applications from their initially-assigned hardware classes in the initial mapping to the particular hardware class.

20 Claims, 12 Drawing Sheets

Actual Utilization Data

1002

| App | Estimated Utilization | Actual Utilization |
|---|---|---|
| 1 | 20% of Low | 17% of Low |
| 2 | 45% of High | 48% of High |
| 3 | 40% of Low | 32% of Low |
| 4 | 80% of Low | 80% of Low |
| 5 | 35% of High | 40% of High |

*FIG. 10A*

Unit Map Conversion Table

1004

| Conversion Type | Conversion Factor |
|---|---|
| Low to Medium | 0.7 |
| Medium to High | 0.571 |
| Low to High | 0.4 |
| High to Medium | 1.75 |
| Medium to Low | 1.43 |
| High to Low | 2.5 |

*FIG. 10B*

Cost Ratio Conversion Table

1006

| Hardware Class | $ per 1% |
|---|---|
| Low | 0.90 |
| Medium | 0.70 |
| High | 1.10 |

*FIG. 10C*

Equivalent Utilization Table

1102

| Application | ACTUAL | Utilizations equivalent to ACTUAL | | |
| --- | --- | --- | --- | --- |
| | | % of L util | % of M util | % of H util |
| 1 | 17% of L | 17% of L | 11.9% of M | 6.8% of H |
| 2 | 48% of H | 120% of L | 84% of M | 48% of H |
| 3 | 32% of L | 32% of L | 22% of M | 12% of H |
| 4 | 80% of L | 80% of L | 56% of M | 32% of H |
| 5 | 40% of H | 100% of L | 70% of M | 40% of H |

*FIG. 11*

1202 — Equivalent Cost Table

| Application | ACTUAL | Costs of utilizations equivalent to ACTUAL | | |
| --- | --- | --- | --- | --- |
| | | $/L util | $/M util | $/H util |
| 1 | $15.30 | $15.30 Equivalent | $8.33 Better Fit | $7.48 Best Fit |
| 2 | $52.80 | $108.00 Worst fit | $58.80 Worse Fit | $52.80 Equivalent/Best |
| 3 | $28.80 | $28.80 Equivalent | $15.68 Better Fit | $14.08 Best Fit |
| 4 | $72.00 | $72.00 Equivalent | $39.20 Better Fit | $35.20 Best Fit |
| 5 | $44.00 | $90.00 Worst fit | $49.00 Worse Fit | $44.00 Equivalent/Best |

*FIG. 12*

METHOD FOR RESOURCE AND PERFORMANCE MATCHING IN VIRTUAL POOL OF MIXED GRAPHICS WORKLOADS

TECHNICAL FIELD

This disclosure relates generally to cloud computing environments, and more specifically to mapping applications to hardware in cloud computing environments.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which:

FIG. 10A is an example actual utilization data table showing actual utilization data gathered by performance monitoring within a certain time window;

FIG. 10B is an example unit map conversion table showing conversion factors for converting workload percentages between different classes of hardware;

FIG. 10C is an example cost ratio conversion table showing conversion factors for converting between utilization percentages and costs;

FIG. 11 is an example equivalent utilization table showing equivalent utilization percentages that correspond to actual measured utilizations for example applications on low, medium, and high performance hardware classes;

FIG. 12 is an example equivalent cost table showing the costs of equivalent utilizations for example applications on low, medium, and high performance hardware classes.

DESCRIPTION OF EXAMPLE EMBODIMENTS

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-12 wherein like numbers are used to indicate like and corresponding parts.

Figure 1:
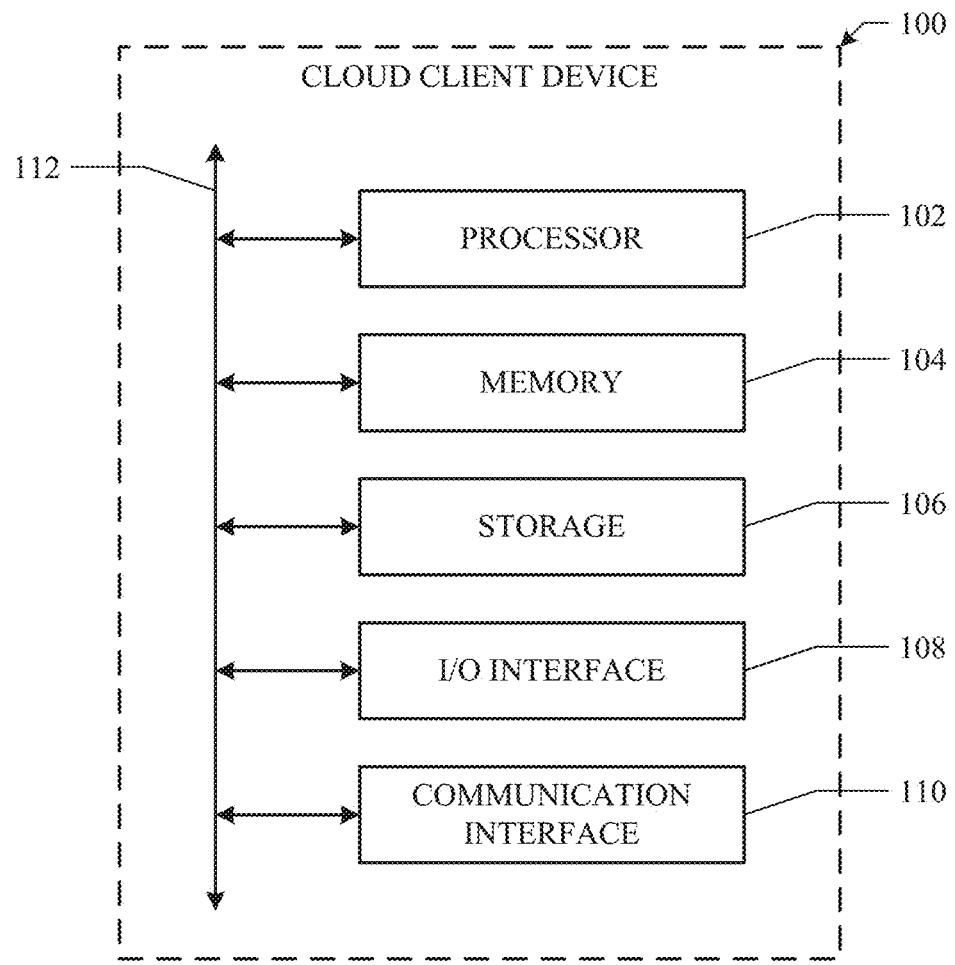
FIG. 1 is a block diagram of selected elements of an embodiment of a cloud client device.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 comprises a cloud client device (CCD). A CCD may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. The CCD may include networking or communication interfaces 110 that support IEEE 802.11 protocols (including a, b, g, or n), single or dual band WiFi, BLUETOOTH communication, and near field communication (NFC). The CCD may include one or more operating systems, including versions of Android, Windows, Wyse ThinOS, Linux, or Apple iOS. The CCD may include one or more native applications, including, for example, a browser, a media player and recorder, voice over IP and video communication software, and software for remote access to cloud services or other remote content or services. The CCD may plug directly into a device (e.g., a display device such as a television, monitor, or projector), may be connected via a cable (via one of the above-described interfaces) to a device, or may be connected via a wireless interface to a device (e.g., a display or client device). A user may, for example, use the CCD to securely communicate; access files or contents that are on the CCD, on another local device, or on a remote device (e.g., in a server of a cloud services organization); or control, interact with, or mediate one or more local devices (e.g., client devices) or remote devices (e.g., remote client devices). The CCD may be remotely provisioned, authenticated, and controlled including, for example, by a cloud service.

Figure 2:
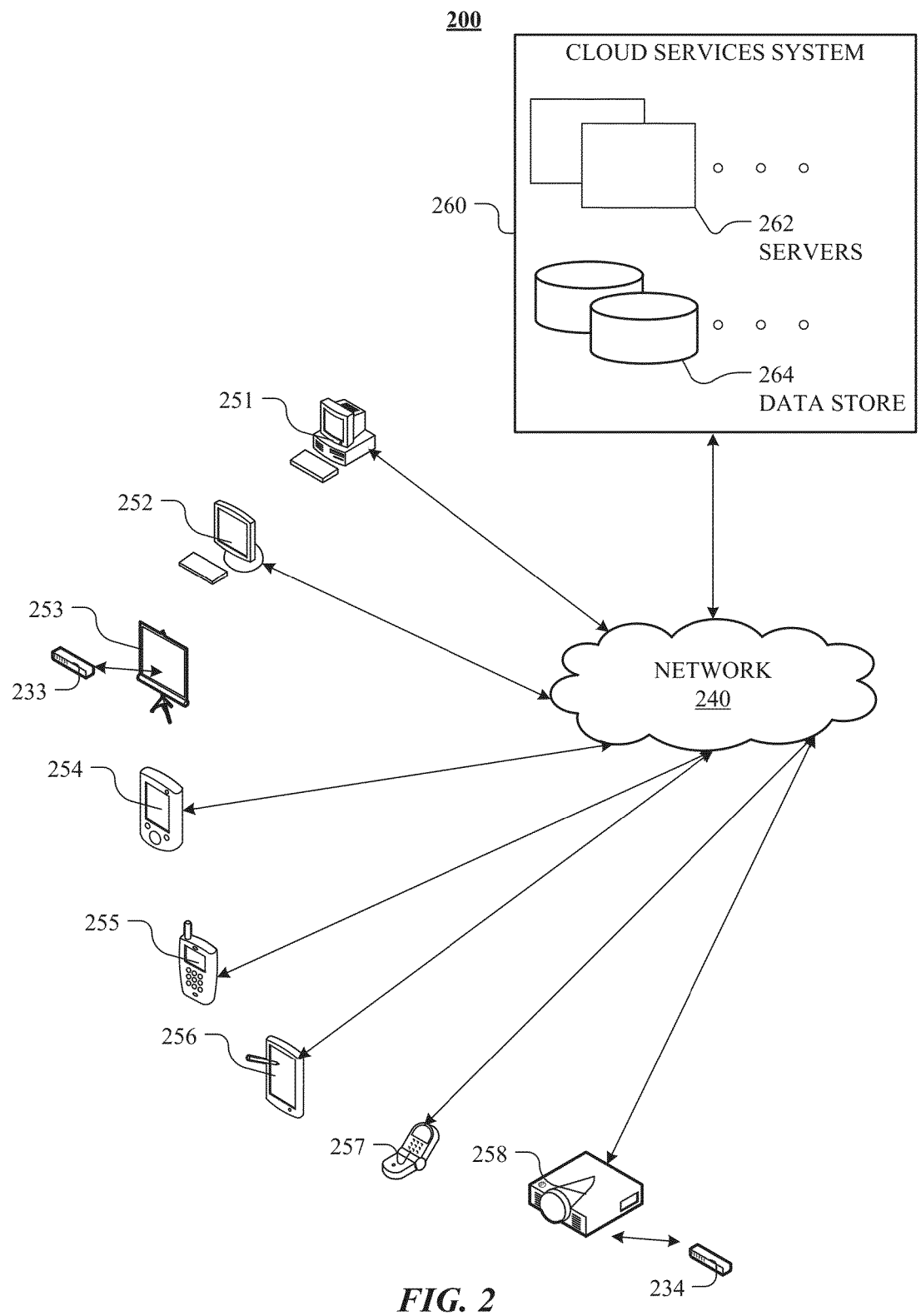
FIG. 2 is an example of a network environment in which a cloud client device may operate.

FIG. 2 illustrates an example network environment 200 in which a cloud client device may operate with other local or remote devices. In the example of FIG. 2, multiple devices and displays (e.g., elements 251, 252, and 254-258) are communicatively coupled (e.g., in any suitable wired or wireless fashion) to a network 240. Network 240 may be any suitable type of network including, for example, an ad hoc network, a personal area network (PAN), a local area network (LAN), a wide area network (WAN), a metropolitan area network (MAN), or one or more portions of the Internet or a combination of two or more of these network types. One or more portions of network 240 may be wired or wireless. As an example, network 240 may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

As shown in FIG. 2, Network 240 may allow devices and displays coupled to it (e.g., elements 251, 252, and 254-258) to communicate with a cloud services system 260. Cloud services system 260 may, for example, include one or more servers 262 and a data store 264 including one or more data storage systems. Network 240 may also allow devices and displays coupled to it to communicate with each other. Although not illustrated in FIG. 2, one or more of the devices and displays of network environment 200 may, in particular embodiments, communicate with each other directly (e.g., wirelessly) or via any other suitable communication method.

Figure 3:
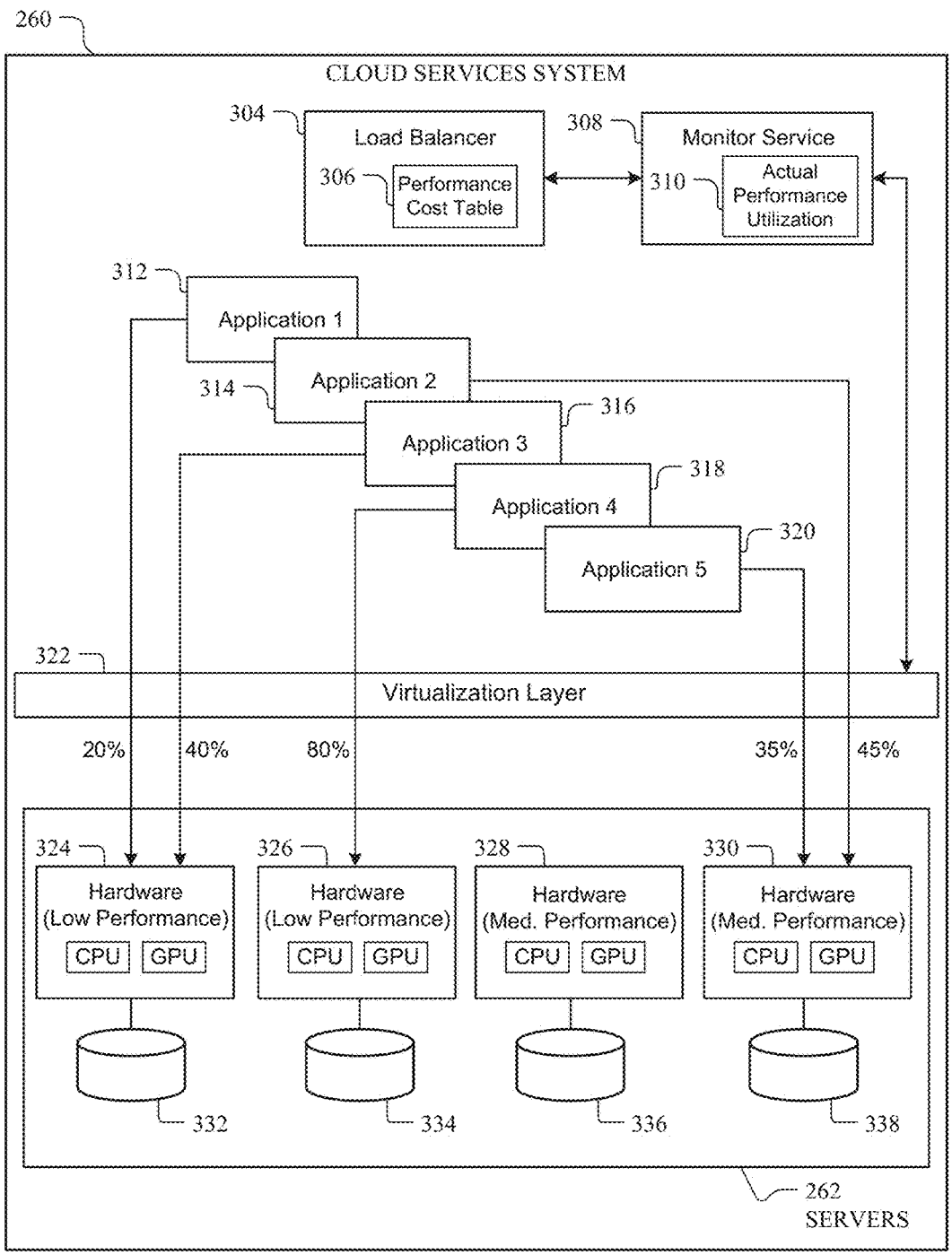
FIG. 3 is an example of an initial mapping between hardware and applications in a cloud services system.

FIG. 3 is an example of an initial mapping between hardware and applications in a cloud services system 260. The initial mapping may be represented as an association between hardware device classes 324-330 and applications 312-320, in which expected utilization percentages are associated with each hardware-application association, as shown by the arrows in FIG. 3. The initial mapping may be generated by an administrator, automated heuristics, or other technique.

The cloud services system 260 includes a virtualization layer 322 that may assign, i.e., map, each of the applications 312-320 to be executed on one of the servers 262. The servers 262 may include hardware devices 324-330, which perform computations to execute the assigned applications 312-320, and data storage units 332-338, which may be associated with the hardware devices 324-330 and store data used by the hardware 324-330, such as input data, working data, and output data. Each hardware device 324-330 may include a Central Processing Unit (CPU) and a Graphics Processing Unit (GPU), either or both of which may execute applications that are mapped to the hardware device. Each hardware device 324-330 has an associated hardware class, which characterizes the performance and cost of executing applications on the hardware. For example, hardware units 324 and 326 are in the "low performance" class, and hardware units 328 and 330 are in the "medium performance" class. Other classes may exist, e.g., a "high performance" class (not shown). The servers 262 may include other components that are omitted from FIG. 3 for clarity of explanation.

The cloud services system 260 also includes a load balancer 304 that may adjust the assignment, i.e., mapping, of applications 312-320 to hardware 324-330 based on actual performance utilization data 310 gathered by a monitor service 308 and a performance cost table 306 that associates costs with the hardware classes. The load balancer 304 may, in cooperation with the virtualization layer 322, cause an application running on one hardware unit to be moved to another hardware unit if doing so is likely to be beneficial. The monitor service 308 gathers performance information in the form of counter values that are gathered by collectors running on the actual hardware units 324-330. The monitor service 308 may communicate with the collectors via network communication, for example. The load balancer 304 and monitor service 308 may communicate with each other via network communication, inter-process communication, or intra-process communication, depending on where they are located in the cloud services system 260.

The example initial mapping shown in FIG. 3 may be generated by an administrator, automated heuristics, or other technique, and may be understood as a "best guess" at a mapping between the applications 312-320 and the hardware units 324-330. The initial mapping is represented as a set of weighted associations that map each of the applications 312-320 to one of the hardware units 324-330. In particular, the first application 312 is mapped to the first hardware unit 324 and is expected to use an estimated 20% of that hardware unit (e.g., at most 20% of the hardware unit's CPU and/or GPU processing capacity. In one aspect, the percentage is a characteristic of the application consuming specific resources, and the applications use the resources that are available. The second application 314 is mapped to the fourth hardware unit 330 and is expected to use 45% of that hardware unit. The third application 316 is mapped to the first hardware unit 324 and is expected to use 40% of that hardware unit. The fourth application 318 is mapped to the second hardware unit 326 and is expected to use 80% of that hardware unit. The fifth application 320 is mapped to the fourth hardware unit 330 and is expected to use 35% of that hardware unit. Note that although a specific number of applications and a specific number of hardware units are shown in FIG. 3, the techniques disclosed herein may be used with any number of applications and hardware units, the hardware units may be of any classes, and the initial mapping may map any particular set of applications to any particular set of hardware units according to any particular percentages.

Figure 4:
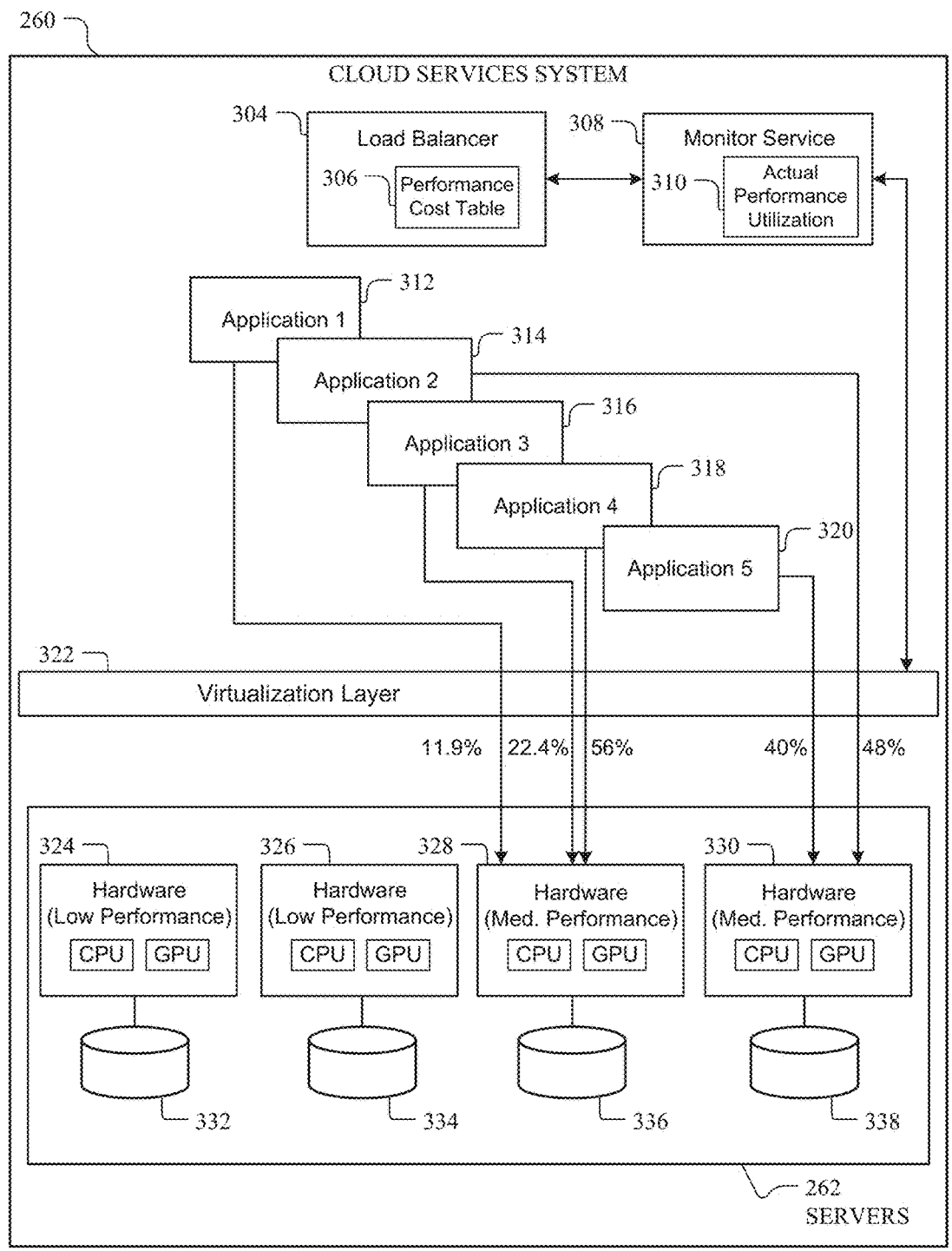
FIG. 4 is an example of a lower-cost mapping between hardware and applications in a cloud services system.

FIG. 4 is an example of a lower-cost mapping between hardware and applications in a cloud services system. The lower-cost mapping of FIG. 4 may be generated by the disclosed techniques, such as the method of FIG. 5. The lower-cost mapping is different from the initial mapping of FIG. 3, and is expected to have a lower total cost of execution (e.g., cost less money) than the initial mapping for the same application workload, while retaining a similar service-level agreement. In the lower-cost mapping, the first application 312 is mapped to the third hardware unit 328 and is expected to use 11.9% of that hardware unit. The second application 314 is mapped to the fourth hardware unit 330 and is expected to use 48% of that hardware unit. The third application 316 is mapped to the third hardware unit 328 and is expected to use 22.4% of that hardware unit. The fourth application 318 is mapped to the third hardware unit 328 and is expected to use 56% of that hardware unit. The fifth application 320 is mapped to the fourth hardware unit 330 and is expected to use 40% of that hardware unit. The load balancer 304 or other component of the cloud services system 260 may generate this mapping based on the actual performance utilization data 310 gathered by the monitor service 308, as described below.

In particular embodiments, the cloud services system 260 may generate a reduced-cost mapping of applications 312-320 to hardware processors 324-330 based on an initial mapping and performance data gathered by monitoring execution of the applications on the hardware processors 324-330 according to the initial mapping. The reduced-cost mapping is expected to meet the same performance requirements as the initial mapping, while achieving the lowest identified system cost. Remapping the applications to different hardware processors, which may include remapping to different classes of hardware processors, in accordance with the reduced-cost mapping, is expected to result in the most cost-effective utilization of the hardware processors by the applications while maintaining the lowest cost of operation. As an example and not by way of limitation, remapping one or more of the applications 312-320 from one of the hardware processors 324-330 to another may involve moving the application's data between the processors and/or the processors' storage units 332-338, and/or updating metadata that points to the application's data without moving the actual data. As an example and not by way of limitation, user and application data migration may be done using a shared storage model across hardware units to achieve "zero" copy migration (i.e. moving only meta-data) of applications to re-mapped processors when possible. As another example and not by way of limitation, application data may be copied from a local data storage unit 332-338 of a hardware unit 324-330 from which the application is being moved to a different one of the local data storage units 332-338 of a hardware unit to which the application is being moved. The copying may be performed, for example, by sending the data to be copied between the hardware units via a network or shared memory. Although this disclosure describes re-mapping or moving applications between hardware units in a particular manner, this disclosure contemplates re-mapping or moving applications between hardware units in any suitable manner.

Figure 6:
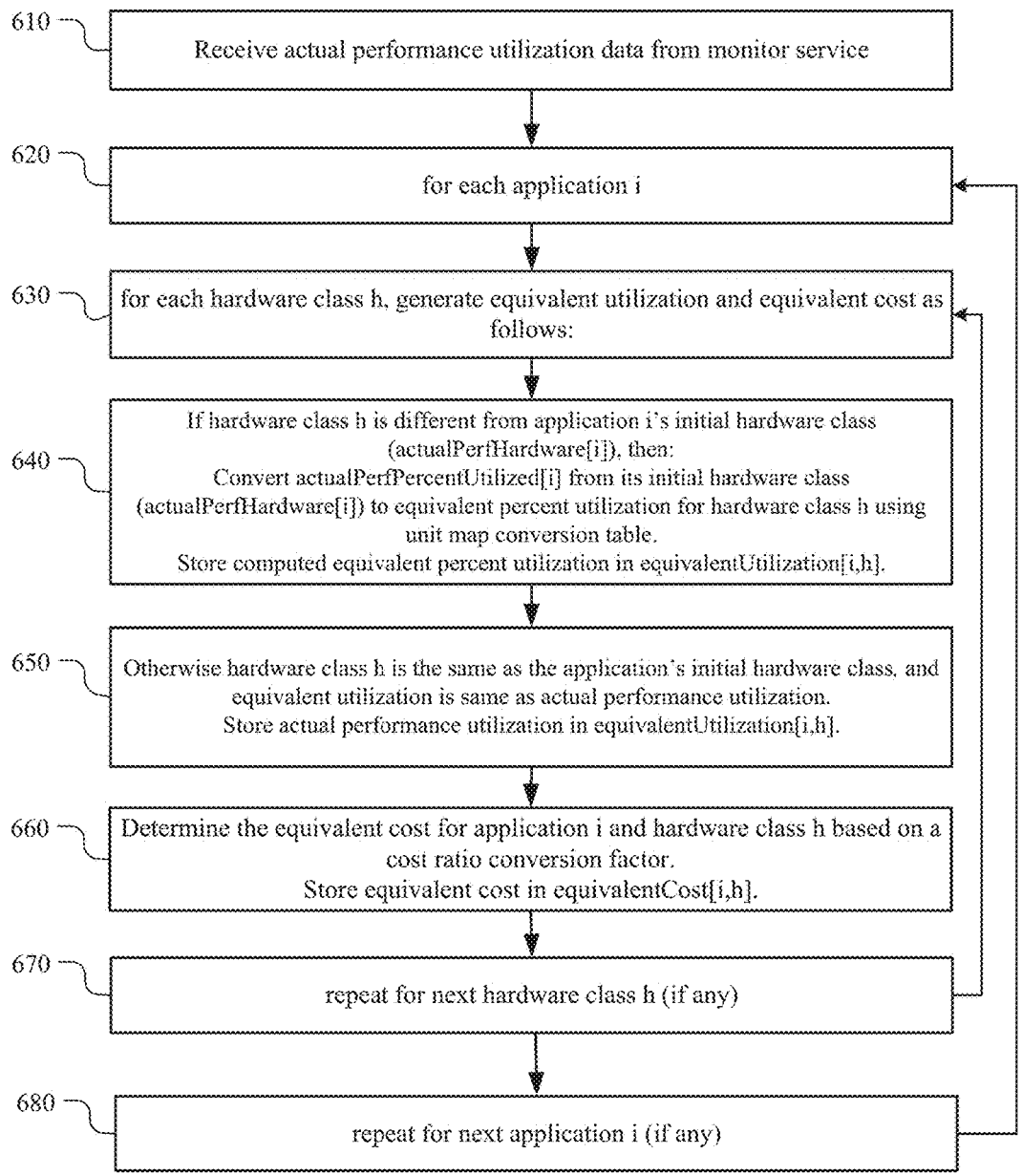
FIG. 6 is a flowchart depicting an example method for generating relative cost/performance reference tables.
Figure 7:
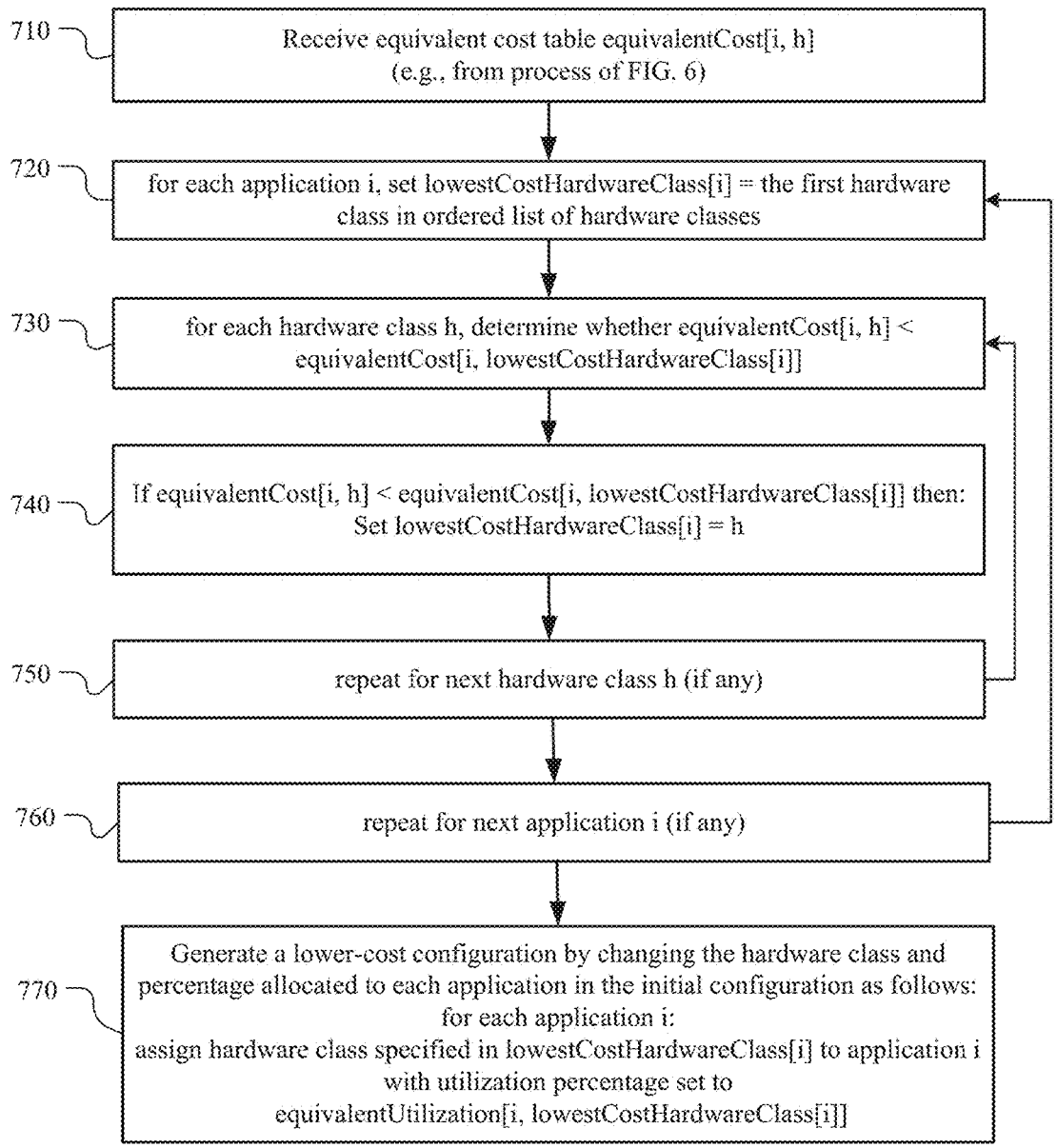
FIG. 7 is a flowchart depicting an example method for generating a lower-cost configuration that assigns applications to the lowest-cost hardware identified for the applications.

In particular embodiments, the reduced-cost mapping may be generated by starting with a "best guess" initial mapping. After an initial deployment and execution of applications, utilization of the virtual resources per application may be measured by monitoring the hardware devices 324-330 (e.g., collecting performance counter data, timing data, or other performance measurement technique). The measured utilization may be compared with the initial mapping to determine over or under utilization. Hardware resources such as CPUs and GPUs may be reassigned to different applications based on heuristic data, e.g., as shown in FIGS. 6 and 7. The hardware resources are defined based on hardware classes of CPU, GPU, or applications. Although this disclosure describes generating a reduced-cost mapping in a particular manner, this disclosure contemplates generating a reduced-cost mapping in any suitable manner.

In particular embodiments, to determine a lower-cost mapping, the cloud services system 260 may determine a baseline actual hardware performance utilization of a set of hardware computing devices for a set of applications 312-320 in accordance with an initial mapping. The initial mapping maps a set of hardware resource classes to the set of applications 312-320, where each of the hardware computing devices is associated with one of the hardware resource classes. The hardware resource classes may be, for example, low, medium, and high, representing hardware having relatively low performance, medium performance, and relatively high performance, respectively.

As an example and not by way of limitation, the cloud services system 260 may use a predetermined initial mapping, and the initial mapping may be any operable assignment of hardware devices to applications. As another example and not by way of limitation, the cloud services system 260 may determine the initial mapping in accordance with an estimated performance utilization of the at least one application. A baseline actual hardware performance utilization of the hardware computing device 324-330 for the applications 312-320 is determined by executing the applications 312-320 on the hardware computing device(s) 324-330 according to the initial mapping, and collecting hardware performance data for a period of time while the applications 312-320 execute. The baseline actual hardware performance utilization of the at least one computing device for the at least one application may then be determined based on the hardware performance data. The hardware performance data may be represented by hardware counters that indicate how much of the CPU or GPU was utilized during execution of the application. The counter data may be collected by the monitor service 308, which may construct a table of the utilization of each application on each hardware unit. Although this disclosure describes determining the baseline performance utilization in a particular manner, this disclosure contemplates determining the baseline performance utilization in any suitable manner.

In particular embodiments, the cloud services system 260 may determine a lower-cost configuration in which each application is assigned to the hardware class having a identified lowest equivalent cost for that application. To determine the lower-cost configuration, the equivalent cost that would be incurred by executing the application on each of the different hardware classes is determined for each application, and for each application, the hardware class having the lowest equivalent cost is selected as the hardware class to which the application is mapped in the lower-cost configuration. In particular embodiments, the equivalent cost of each application's equivalent utilization may be determined by multiplying an equivalent utilization of the application for that hardware class by a cost per percentage of utilization conversion factor associated with that hardware class. Although this disclosure describes determining a lower-cost configuration in a particular manner, this disclosure contemplates determining a lower-cost configuration in any suitable manner.

In particular embodiments, the cloud services system 260 may determine the equivalent utilization of each application based on the baseline actual hardware performance utilization. As an example and not by way of limitation, the cloud services system 260 may determine the equivalent utilization of each application for each hardware class by mapping an actual performance utilization of each application from the hardware class mapped to the application to the corresponding equivalent utilization of each different hardware class by multiplying the actual performance utilization of each application by a conversion factor that relates utilization of the hardware class mapped to the application to the corresponding equivalent utilization of each different hardware class, where each different hardware class is a hardware class different from the hardware class mapped to the application. Although this disclosure describes determining the equivalent utilization of each application in a particular manner, this disclosure contemplates determining the equivalent utilization of each application in any suitable manner.

In particular embodiments, the cloud services system 260 may determine the sum of the lowest equivalent costs for each application assigned to a particular hardware class by the lower-cost configuration. When the sum of the lowest equivalent costs for each application assigned to a particular hardware class by the lower-cost configuration is less than a threshold value, the cloud services system 260 may move one or more applications from their initially-assigned hardware classes in the initial mapping to the particular hardware class to which the application is assigned in the lower-cost configuration.

Figure 5:
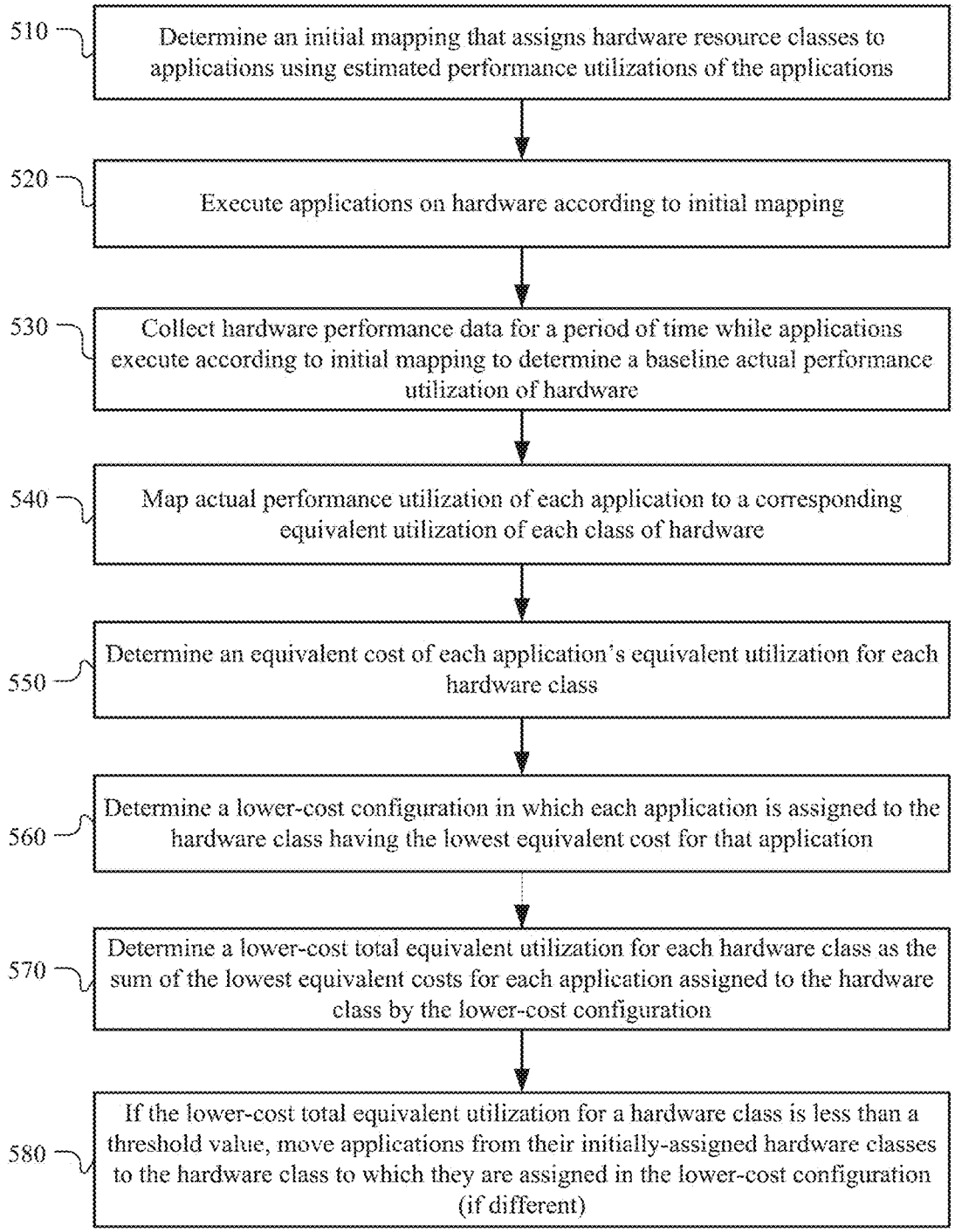
FIG. 5 is flowchart depicting an example method for generating a lower-cost mapping in a cloud services system.

FIG. 5 is flowchart depicting an example method 500 for generating a lower-cost mapping in a cloud services system 260. The method may begin at step 510, where the cloud services system 260 may determine an initial mapping that assigns hardware resource classes to applications using estimated performance utilizations of the applications. At step 520, the cloud services system 260 may execute applications on hardware according to the initial mapping. At step 530, the cloud services system 260 may collect hardware performance data for a period of time while applications execute according to the initial mapping to determine a baseline actual performance utilization of the hardware. At step 540, the cloud services system 260 may map the actual performance utilization of each application to a corresponding equivalent utilization for each class of hardware. In one aspect, for a hardware class assigned by the initial mapping, the equivalent utilization is the same as the actual performance utilization. At step 550, the cloud services system 260 may determine an equivalent cost of each application's equivalent utilization for each hardware class. At step 560, the cloud services system 260 may determine a lower-cost configuration in which each application is assigned to the hardware class having the lowest equivalent cost for that application. At step 570, the cloud services system 260 may determine a lower-cost total equivalent utilization for each hardware class as the sum of the lowest equivalent costs for each application assigned to the hardware class by the lower-cost configuration. At step 580, the cloud services system 260 may determine if the lower-cost total equivalent utilization for a hardware class is less than a threshold value, and, if so, move applications from their initially-assigned hardware classes to the hardware class to which they are assigned in the lower-cost configuration (if the hardware class in the lower-cost configuration is different from the initially-assigned hardware class).

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating a lower-cost mapping including the particular steps of the method of FIG. 5, this disclosure contemplates any suitable method for generating a lower-cost mapping including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 is a flowchart depicting an example method 600 for generating relative cost/performance reference tables, which are referred to herein as an equivalent utilization table and an equivalent cost table. An example equivalent utilization table is shown in FIG. 11, and an example equivalent cost table is shown in FIG. 12. The equivalent utilization and cost tables generated by the method 600 may be represented in computer program code by two arrays (e.g., sequences of data values for each of the applications), which are named equivalentUtilization[ ] (e.g., as shown in FIG. 11) and equivalentCost[ ] (e.g., as shown in FIG. 12) and indexed by application number i. The method 600 may begin at step 610, in which the cloud services system 260 may receive actual performance utilization data from the monitor service 308. The actual performance utilization data may be represented by two arrays, which are named actualPerfPercentUtilized[ ] and actualPerfHardware[ ] and indexed by application number i (e.g., i ranges from 1 to the number of applications). The value of each array element actualPerfPercentUtilized[i] is the actual percent utilization for application i. The value of each array element actualPerfHardware[i] is one of L, M, H (low, medium, or high). At step 620, the cloud services system 260 may prepare to repeat the subsequent steps for each application i. At step 630, the cloud services system 260 may prepare to repeat the subsequent steps for each hardware class h (e.g., in a nested loop) to generate the equivalent utilization and equivalent cost arrays. At step 640, the cloud services system 260 may determine whether hardware class h is different from application i's initial hardware class (actualPerfHardware[i]), and, if so, convert the percent utilization given by actualPerfPercentUtilized[i] from its initial hardware class (actualPerfHardware[i]) to an equivalent percent utilization for hardware class h using a unit map conversion table that converts between hardware classes (e.g., 10% L=7% M=4% H, as shown in FIG. 10B). For example, step 640 may set equivalentUtilization[i, h] to actualPerfPercentUtilized[i] multiplied by a fractional conversion factor for converting from hardware class actualPerfHardware[i] to hardware class h). At step 650, if hardware class h is the same as the application's initial hardware class (e.g., the application's class assigned by the initial mapping), the cloud services system 260 may set equivalentUtilization[i, h]=actualPerfPercentUtilized[i], because, for a hardware class assigned by the initial mapping, the equivalent utilization is the same as the actual performance utilization. At step 660, the cloud services system 260 may determine the equivalent cost for application i and hardware class h based on a cost ratio conversion factor for converting from utilization percentages to costs. For example, step 660 may set equivalentCost[i,h]=equivalentUtilization[i, h] multiplied by the cost ratio conversion for hardware class h (e.g., by $0.90 per 1% if h is the Low class, by $0.70 per 1% if h is the Medium class, or by $1.10 per 1% if h is the High class). At step 670, the cloud services system 260 may repeat the previous steps for the next hardware class h (if any). At step 680, the cloud services system 260 may repeat the previous steps for the next application i (if any).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating a relative cost/performance reference table including the particular steps of the method of FIG. 6, this disclosure contemplates any suitable method for generating a relative cost/performance reference table including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

FIG. 7 is a flowchart depicting an example method 700 for generating a lower-cost configuration that assigns applications to the lowest-cost hardware identified for the application. The lowest-cost hardware may be the hardware class with the lowest equivalentCost value for the application, and is represented by the value lowestCostHardwareClass[i] (for application i). The method 700 sets lowestCostHardwareClass[i] =equivalentCost[i, L] where L is the hardware class of the lowest value of equivalentCost(i, h).The method may begin at step 710, where the cloud services system 260 may an receive equivalent cost table equivalentCost[i, h] (e.g., from the process of FIG. 6). At step 720, the cloud services system 260 may, for each application i, set lowestCostHardwareClass[i]=the first hardware class in the list of hardware classes. At step 730, the cloud services system 260 may, for each hardware class h, determine whether equivalentCost[i, h]<equivalentCost[i, lowestCostHardwareClass[i]]. At step 740, if equivalentCost[i, h]<equivalentCost[i, lowestCostHardwareClass[i]] then the cloud services system 260 may set lowestCostHardwareClass[i]=h. At step 750, the cloud services system 260 may repeat steps 730 and 740 for the next hardware class h in the list of hardware classes (if any remain unprocessed). At step 760, the cloud services system 260 may repeat steps 730, 740, and 750 for the next application i in the list of applications (if any remain unprocessed). At step 770, the cloud services system 260 may generate a lower-cost configuration by changing the hardware class and percentage allocated to each application in the initial configuration. For example, step 770 may, for each application i, assign the hardware class specified in lowestCostHardwareClass[i] to application i with a utilization percentage set to equivalentUtilization[i, lowestCostHardwareClass[i]].

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating a lower-cost configuration including the particular steps of the method of FIG. 7, this disclosure contemplates any suitable method for generating a lower-cost configuration including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
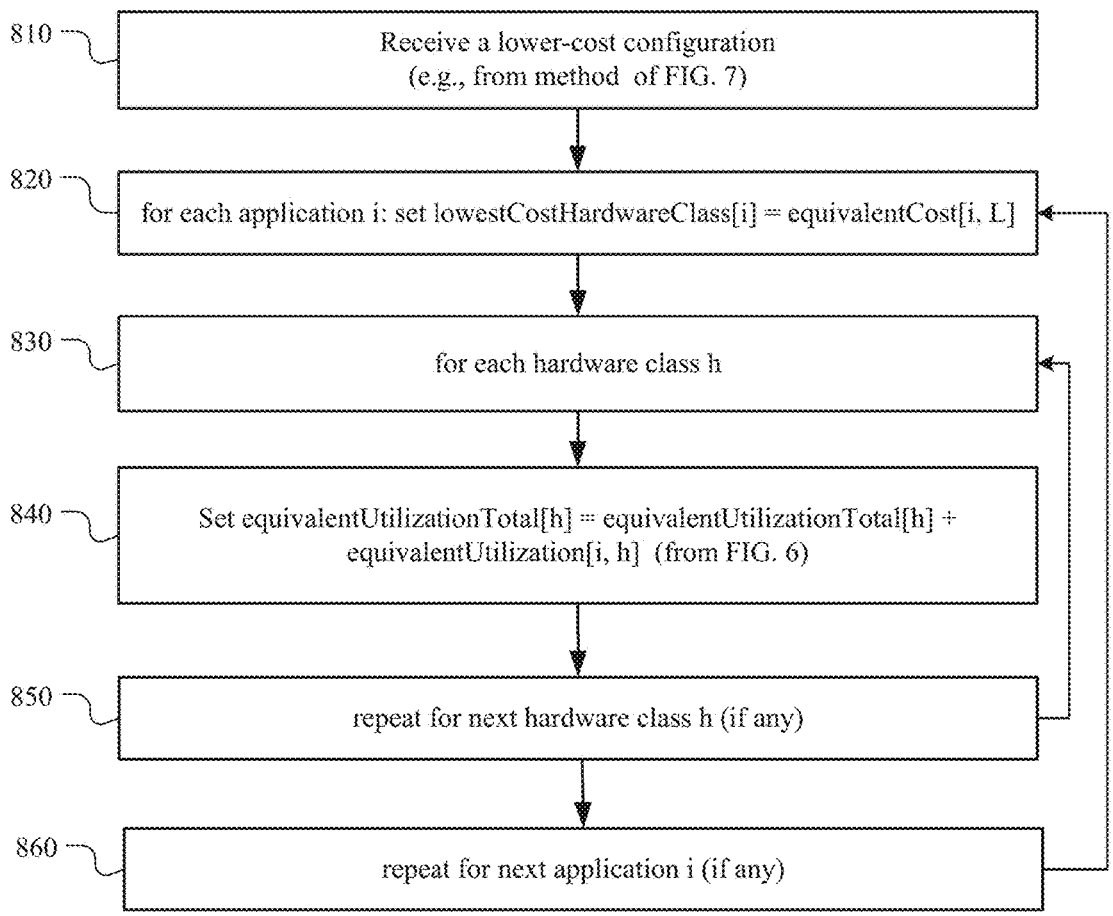
FIG. 8 is a flowchart depicting an example method for computing total utilization values of each hardware class in a lower-cost configuration.

FIG. 8 is a flowchart depicting an example method 800 for computing total utilization values of each hardware class in a lower-cost configuration. The method 800 stores the total utilization values in an equivalentUtilizationTotal[ ] array. The method may begin at step 810, where the cloud services system 260 may receive a lower-cost configuration (e.g., from the method of FIG. 7). At step 820, the cloud services system 260 may, for each application i, set lowestCostHardwareClass[i] =equivalentCost[i, L], and prepare to execute blocks 830-840 for each application i. At step 830, the cloud services system 260 may prepare to execute block 840 for each hardware class h. At step 840, the cloud services system 260 may, for each hardware class h, find the total value of the equivalent utilizations of all applications assigned to h, and set equivalentUtilizationTotal[h] to that total value. Step 840 sets equivalentUtilizationTotal[h] to equivalentUtilizationTotal[h] plus equivalentUtilization[i, h] (from FIG. 6). At step 850, the cloud services system 260 may repeat step 840 for the next hardware class h (if any). At step 860, the cloud services system 260 may repeat steps 830-850 for the next application i (if any).

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for computing total utilization values of each hardware class in a lower-cost configuration including the particular steps of the method of FIG. 8, this disclosure contemplates any suitable method for computing total utilization values of each hardware class in a lower-cost configuration including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
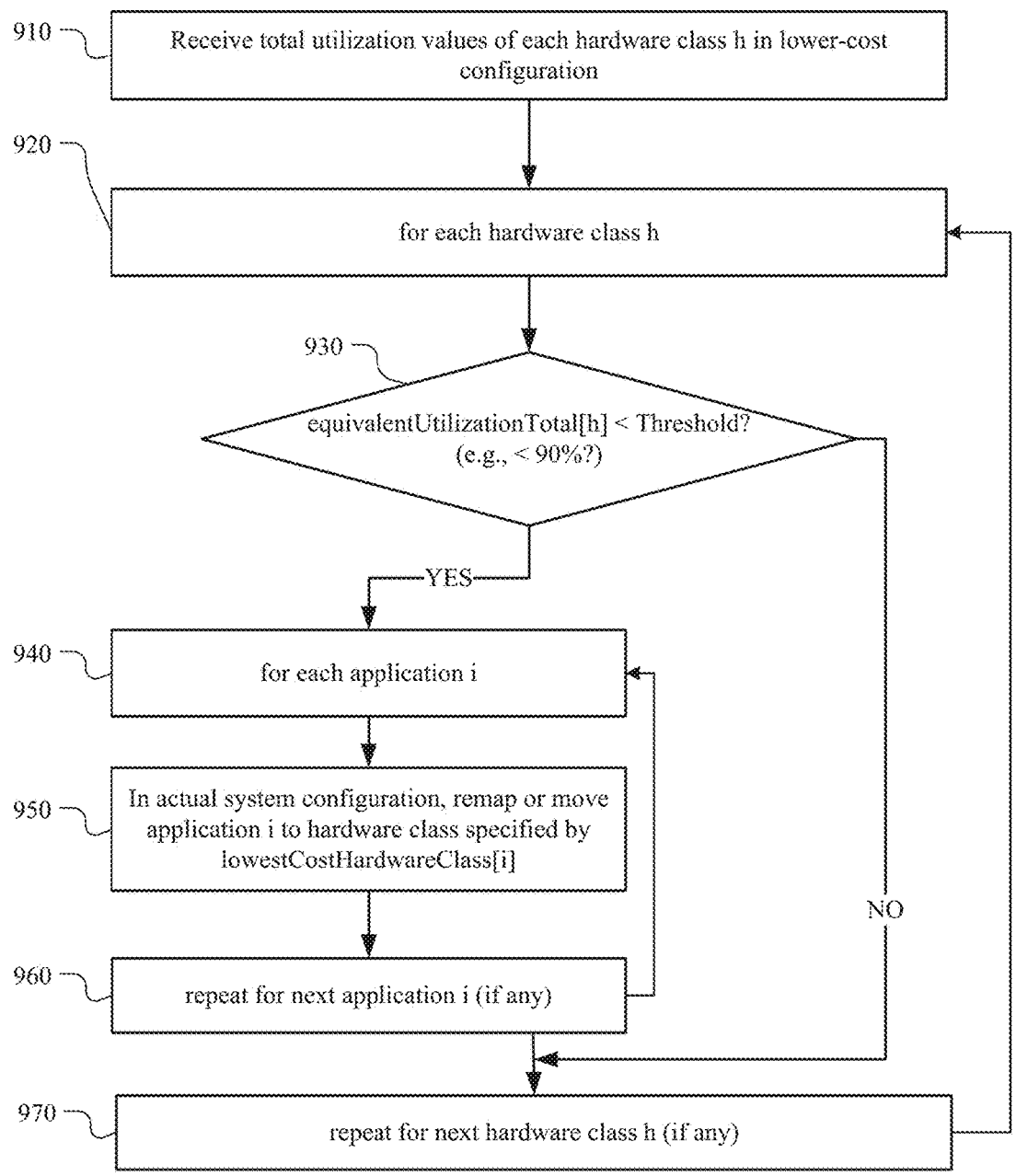
FIG. 9 is a flowchart depicting an example method for remapping or moving applications from their initially-assigned hardware classes to a hardware class assigned by a lower-cost configuration.

FIG. 9 is a flowchart depicting an example method 900 for remapping or moving applications from their initially-assigned hardware classes to a hardware class assigned by a lower-cost configuration. The method 900 may, for each hardware class h, determine whether to move the applications assigned to hardware class h in the lower-cost configuration to a different hardware class for the actual (executable) configuration, and if so, re-map the applications that are assigned to hardware class h in the lower-cost configuration so that they are assigned to h in the actual configuration. The method may begin at step 910, where the cloud services system 260 may receive total utilization values of each hardware class h in a lower-cost configuration (e.g., the equivalentUtilizationTotal[ ] array from the method of FIG. 8). At step 920, the cloud services system 260 may prepare to repeat steps 930-960 for each hardware class h. At step 930, the cloud services system 260 may determine whether the equivalentUtilizationTotal[h] is less than a threshold value (e.g., less than 90%). If not, control transfers to step 970, which repeats step 930 for the next hardware class h (if any). Otherwise, if step 930 determines that the equivalent utilization total is less than the threshold value, then execution continues at step 940. At step 940, the cloud services system 260 may prepare to repeat steps 950-960 for each application i. At step 950, the cloud services system 260 may, in the actual system configuration, remap (or move) application i to the hardware class specified by lowestCostHardwareClass[i]. At step 960, the cloud services system 260 may repeat step 950 for the next application i (if any). At step 970, the cloud services system 260 may repeat steps 930-960 for the next hardware class h (if any).

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for remapping or moving applications from their initially-assigned hardware classes to the hardware class to which they are assigned in the lower-cost configuration including the particular steps of the method of FIG. 9, this disclosure contemplates any suitable method for remapping or moving applications from their initially-assigned hardware classes to the hardware class to which they are assigned in the lower-cost configuration including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

FIG. 10A is an example actual utilization data table 1002 showing actual utilization data gathered by performance monitoring within a certain time window. FIG. 10A shows five example applications, numbered 1 through 5. Each application may be mapped to a hardware class. In the example of FIG. 10A, there are three hardware classes: Low, Medium, and High. The names of the hardware classes indicate their relative cost and performance levels, so the Low hardware class corresponds to hardware that has relatively low cost and performance, the Medium class to medium cost and performance, and the High class to relatively high cost and high performance. The initially-estimated utilization of each application is shown in a column labeled Estimated Utilization. The initially-estimated utilization may be determined by, for example, a cloud system administrator, based on historical data, and may be used in an initial mapping between hardware classes and the applications. The initial mapping may be adjusted by a load balancer 304 as described in FIGS. 3 and 9. The actual utilization gathered by performance monitoring is shown in FIG. 10A in a column labeled Actual Utilization. In the example of FIG. 10A, Application 1 has an estimated 20% utilization of Low (e.g., low performance, low cost) hardware, and an actual 17% utilization of Low hardware. Application 2 has an estimated 45% utilization of High (e.g., high performance, high cost) hardware and an actual 48% utilization of High hardware. Application 3 has an estimated 40% utilization of Low hardware and an actual 32% utilization of Low hardware. Application 4 has an estimated 80% utilization of Low hardware and an actual 80% utilization of Low hardware. Application 5 has an estimated 35% utilization of High hardware and an actual 40% utilization of High hardware. These actual utilizations may be used as a basis for identifying a lower-cost mapping of applications to hardware as shown in the examples of FIGS. 5-9 and 11-14.

FIG. 10B is an example unit map conversion table 1004 showing conversion factors for converting workload percentages, such as those shown in FIG. 10A, between different classes of hardware. The conversion factors shown in FIG. 10B may be used to convert a workload percentage between any two of the listed hardware classes. The conversion factors correspond to an example relation between hardware classes in which 10% of Low hardware equals 7% of Medium hardware, which equals 4% of High hardware. For example, a 17% utilization of Low hardware may be converted to an equivalent utilization of Medium hardware by multiplying 17% by the conversion factor 0.7 to arrive at a 12% utilization of Medium hardware.

FIG. 10C is an example cost ratio conversion table 1006 showing conversion factors for converting between utilization percentages and costs. FIG. 10C shows three different conversion factors that correspond to the three different example hardware classes. For the Low hardware class, the conversion factor $0.90 per 1% of utilization can be used to convert between utilization percentages and costs. For example, the cost of a 17% utilization of Low hardware is equivalent to 17% multiplied by $0.90 per 1%, which is $15.30 per 1% of Low hardware. Similarly, the conversion factors for the Medium and High hardware classes are $.70 per 1% and $1.10 per 1%, respectively.

FIG. 11 is an example equivalent utilization table 1102 showing equivalent utilization percentages that correspond to actual measured utilizations for example applications on low, medium, and high performance hardware classes. The equivalent utilizations for each class of hardware are computed for use in identifying lower-cost mappings. The equivalent utilizations may be computed by, for example, the method of FIG. 6, and used by, e.g., the method of FIG. 7. The equivalent utilizations in FIG. 11 may be calculated by multiplying the actual measured utilizations by the appropriate hardware conversion factors shown in FIG. 10B. For example, for application 1, the actual measured utilization is 17% of Low hardware, which is converted to 11.9% of Medium hardware by multiplying 17% by the low to medium conversion factor of 0.7 shown in FIG. 10B. Further, for application 1, the percentage of High hardware, 6.8%, is computed by multiplying 17% of Low hardware by the low to high conversion factor of 0.4 (shown in FIG. 10B). The equivalent utilizations for applications 2-5 may be computed similarly.

FIG. 12 is an example equivalent cost table 1202 showing the costs of the equivalent utilizations of FIG. 11 for example applications in the low, medium, and high performance hardware classes. The equivalent costs for the hardware classes are used to identify lower-cost mappings. The equivalent costs may be computed by the method of FIG. 6 and used by the methods of FIGS. 7-9. For example, each cost in the table 1202 may be computed by multiplying the corresponding utilization value in FIG. 11 by the appropriate conversion factor from FIG. 10C. For the Low hardware class, the utilization-to-cost conversion factor shown in FIG. 10C is $0.90 per 1% of utilization. This conversion factor may be used to convert from the utilization percentages of FIG. 11 to the costs of FIG. 12. For example, in FIG. 11, the actual measured cost of application 1 is 17% of the Low hardware class. The equivalent actual cost is 17% multiplied by $0.90 per 1%, which is $15.30 per 1% of Low hardware, as shown in the application 1 row of FIG. 12.

In particular embodiments, the equivalent cost table 1202 may be used to find a lowest-cost configuration by identifying the lowest cost in the table 1202 for each application, and assigning the corresponding hardware class to the application. If the lowest cost hardware is the same as the measured actual cost, then the application is already assigned to the lowest-cost class, and that class is used in the lowest-cost configuration. In FIG. 12, the lowest cost for application 1 is $7.48 (which is less than $15.30 and $8.33). Since $7.48 corresponds to the High hardware class, application 1 is remapped (e.g., moved) from its initially-assigned hardware class (Low) to the High hardware class. The lowest cost for application 2 is $52.80, and application 2 remains mapped to the High hardware class associated with the $52.80 cost. The lowest cost for application 3 is $14.08, so application 3 is remapped to the High hardware class associated with the $14.08 cost. The lowest cost for application 4 is $35.20, so application 4 is remapped to the High hardware class associated with the $35.20 cost. The lowest cost for application 5 is $44.00, and application 4 remains mapped to the High hardware class associated with the $44.00 cost. This process of identifying the lowest-cost hardware class and remapping the application to the lowest-cost class may be performed by the method of FIG. 9. In this example, the lowest-cost mapping maps all five applications to the High hardware class, as may occur when the High hardware class is more cost-effective for the workload than the other classes. For other workloads, the lowest-cost hardware class for each application may be the Low or Medium class, depending on the utilizations, and the costs of those utilizations for each application.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a cloud services system, determining a baseline actual hardware performance utilization of a plurality of hardware computing devices for a plurality of applications in accordance with an initial mapping that maps a plurality of hardware resource classes to the plurality of applications, wherein each of the hardware computing devices is associated with one of the plurality of hardware resource classes;
   by the cloud services system, determining a lower-cost configuration in which each application is assigned to the hardware class having a lowest equivalent cost for that application; and
   by the cloud services system, when the sum of the lowest equivalent costs for each application assigned to a particular hardware class by the lower-cost configuration is less than a threshold value, moving one or more applications from their initially-assigned hardware classes in the initial mapping to the particular hardware class.

2. The method of claim 1, further comprising:
   by the cloud services system, determining the initial mapping in accordance with estimated performance utilizations of at least one of the applications.

3. The method of claim 1, wherein determining the baseline actual hardware performance utilization of the plurality of hardware computing devices for a plurality of applications comprises:
   by the cloud services system, causing at least one application to be executed on at least one computing device according to the initial mapping; and
   by the cloud services system, collecting hardware performance data for a period of time while the at least one application executes, wherein the baseline actual hardware performance utilization of the at least one computing device for the at least one application is based on the hardware performance data.

4. The method of claim 1, wherein determining a lower-cost configuration comprises:
   by the cloud services system, determining the equivalent cost of each application's equivalent utilization for each hardware class, and
   by the cloud services system, for each application, selecting the hardware class having the lowest equivalent cost as the hardware class to which the application is mapped in the lower-cost configuration.

5. The method of claim 4, wherein the equivalent cost of each application's equivalent utilization is determined by multiplying an equivalent utilization of the application for that hardware class by a cost per percentage of utilization conversion factor associated with that hardware class.

6. The method of claim 5, further comprising determining the equivalent utilization of each application based on the baseline actual hardware performance utilization.

7. The method of claim 6, wherein determining the equivalent utilization of each application for each hardware class comprises:
   by the cloud services system, mapping an actual performance utilization of each application from the hardware class mapped to the application to the corresponding equivalent utilization of each different hardware class by multiplying the actual performance utilization of each application by a conversion factor that relates utilization of the hardware class mapped to the application to the corresponding equivalent utilization of each different hardware,
   wherein each different hardware class is a hardware class different from the hardware class mapped to the application.

8. A system comprising: one or more processors; and a non-transitory memory coupled to the processors comprising instructions executable by the processors, the processors operable when executing the instructions to:
   determine a baseline actual hardware performance utilization of a plurality of hardware computing devices for a plurality of applications in accordance with an initial mapping that maps a plurality of hardware resource classes to the plurality of applications, wherein each of the hardware computing devices is associated with one of the plurality of hardware resource classes;
   determine a lower-cost configuration in which each application is assigned to the hardware class having a lowest equivalent cost for that application; and
   when the sum of the lowest equivalent costs for each application assigned to a particular hardware class by the lower-cost configuration is less than a threshold value, move one or more applications from their initially-assigned hardware classes in the initial mapping to the particular hardware class.

9. The system of claim 8, the processors further operable when executing the instructions to:

determine the initial mapping in accordance with an estimated performance utilization of at least one of the applications.

10. The system of claim 8, wherein to determine the baseline actual hardware performance utilization of the plurality of hardware computing devices for a plurality of applications, the processors are further operable when executing the instructions to:
cause at least one application to be executed on at least one computing device according to the initial mapping; and
collect hardware performance data for a period of time while the at least one application executes, wherein the baseline actual hardware performance utilization of the at least one computing device for the at least one application is based on the hardware performance data.

11. The system of claim 8, wherein to determine a lower-cost configuration, the processors are further operable when executing the instructions to:
determine the equivalent cost of each application's equivalent utilization for each hardware class, and
for each application, select the hardware class having the lowest equivalent cost as the hardware class to which the application is mapped in the lower-cost configuration.

12. The system of claim 11, wherein to determine the equivalent cost of each application's equivalent utilization the processors are further operable when executing the instructions to multiply an equivalent utilization of the application for that hardware class by a cost per percentage of utilization conversion factor associated with that hardware class.

13. The system of claim 12, wherein the processors are further operable when executing the instructions to determine the equivalent utilization of each application based on the baseline actual hardware performance utilization.

14. The system of claim 13, wherein to determine the equivalent utilization of each application for each hardware class, the processors are further operable when executing the instructions to map an actual performance utilization of each application from the hardware class mapped to the application to the corresponding equivalent utilization of each different hardware class by multiplying the actual performance utilization of each application by a conversion factor that relates utilization of the hardware class mapped to the application to the corresponding equivalent utilization of each different hardware,
wherein each different hardware class is a hardware class different from the hardware class mapped to the application.

15. One or more computer-readable non-transitory storage media embodying software that is operable when executed to:
determine a baseline actual hardware performance utilization of a plurality of hardware computing devices for a plurality of applications in accordance with an initial mapping that maps a plurality of hardware resource classes to the plurality of applications, wherein each of the hardware computing devices is associated with one of the plurality of hardware resource classes;
determine a lower-cost configuration in which each application is assigned to the hardware class having a lowest equivalent cost for that application; and
when the sum of the lowest equivalent costs for each application assigned to a particular hardware class by the lower-cost configuration is less than a threshold value, move one or more applications from their initially-assigned hardware classes in the initial mapping to the particular hardware class.

16. The media of claim 15, wherein the software is further operable when executed to:
determine the initial mapping in accordance with an estimated performance utilization of at least one of the applications.

17. The media claim 15, wherein to determine the baseline actual hardware performance utilization of the plurality of hardware computing devices for a plurality of applications, the software is further operable when executed to:
cause at least one application to be executed on at least one computing device according to the initial mapping; and
collect hardware performance data for a period of time while the at least one application executes, wherein the baseline actual hardware performance utilization of the at least one computing device for the at least one application is based on the hardware performance data.

18. The media of claim 15, wherein to determine a lower-cost configuration, the software is further operable when executed to:
determine the equivalent cost of each application's equivalent utilization for each hardware class, and
for each application, select the hardware class having the lowest equivalent cost as the hardware class to which the application is mapped in the lower-cost configuration.

19. The media of claim 18, wherein to determine the equivalent cost of each application's equivalent utilization the software is further operable when executed to multiply an equivalent utilization of the application for that hardware class by a cost per percentage of utilization conversion factor associated with that hardware class.

20. The media of claim 19, wherein the software is further operable when executed to determine the equivalent utilization of each application based on the baseline actual hardware performance utilization.

* * * * *